(12) United States Patent
Ashcraft et al.

(10) Patent No.: US 8,743,538 B2
(45) Date of Patent: Jun. 3, 2014

(54) PROTECTIVE HINGE COVER FOR A MOBILE COMPUTING DEVICE

(75) Inventors: Britt C Ashcraft, Tomball, TX (US); Ki Bok Song, Katy, TX (US); Eric Chen, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 308 days.

(21) Appl. No.: 13/273,778

(22) Filed: Oct. 14, 2011

(65) Prior Publication Data

US 2013/0094134 A1 Apr. 18, 2013

(51) Int. Cl.
  *G06F 1/16* (2006.01)
  *H05K 5/00* (2006.01)
  *H05K 7/00* (2006.01)
  *G06F 1/20* (2006.01)

(52) U.S. Cl.
  USPC ............ 361/679.55; 361/679.27; 361/679.29; 361/679.3; 361/679.56

(58) Field of Classification Search
  USPC ............. 361/679.01, 679.02, 679.04, 679.06, 361/679.07, 679.08, 679.09, 679.17, 361/679.19, 679.26, 679.27, 679.28, 361/679.29, 679.3, 679.55, 679.56; 224/241; 206/755, 251, 261, 268, 470
  See application file for complete search history.

(56) References Cited

U.S. PATENT DOCUMENTS

| 5,633,782 A * | 5/1997 | Goodman et al. ........ 361/679.41 |
| 2011/0096513 A1* | 4/2011 | Kim ............................. 361/747 |

FOREIGN PATENT DOCUMENTS

| JP | 2007127980 A | 5/2007 |
| TW | D14282 S | 7/2011 |
| TW | M408267 Y | 8/2011 |

OTHER PUBLICATIONS

"innovative Laptop Case That Transforms to Workstation"; Jul. 14, 2009; 4 pages.
"Metallic Desk Holder Stand for iPad, iPad 2 and Other Tablet PC"; http://www.tvc-mall.com/details/Metallic-Desk-Holder-Stand-for-iPad-iPad-2-and-other-Tablet-PC-IPAD-291/photos.htm; 3 pages.

* cited by examiner

*Primary Examiner* — Hoa C Nguyen
*Assistant Examiner* — Binh Tran
(74) *Attorney, Agent, or Firm* — Romiwa C. Akpala

(57) ABSTRACT

Embodiments of the present invention disclose a protective hinge cover for a mobile computing device. According to one embodiment, the protective hinge cover includes an inner cavity area for receiving the mobile device along with a rotatable attachment member formed therein. In addition, a plurality of coupling features are utilized to facilitate attachment of the hinge cover with the mobile computing device. Moreover, the rotatable attachment member and housing frame are configured to provide a movable and stable structure for the mobile computing and also allow for adjustment by an operating user so as to provide multiple viewing angles via a hinge mechanism associated with the rotatable attachment member.

19 Claims, 5 Drawing Sheets

PROTECTIVE HINGE COVER FOR A MOBILE COMPUTING DEVICE

BACKGROUND

The emergence and popularity of mobile computing has made portable electronic devices—due to their compact design and light weight—a staple in today's marketplace. Though the portability of these mobile computing devices makes them highly conducive for easy transport, their thin frame and fragileness makes them easily susceptible to damage and failure caused by rough transportation conditions, liquid spills, or accidental drops. Consequently, many users elect to guard their valuable mobile device from damage using a protective sleeve, cover, or carrying case. However, most device casings are unable to provide a platform for presenting the associated display at multiple viewing angles without adding undesirable thickness to the protective cover and overall form factor.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which.

DETAILED DESCRIPTION OF THE INVENTION

Figure 1:
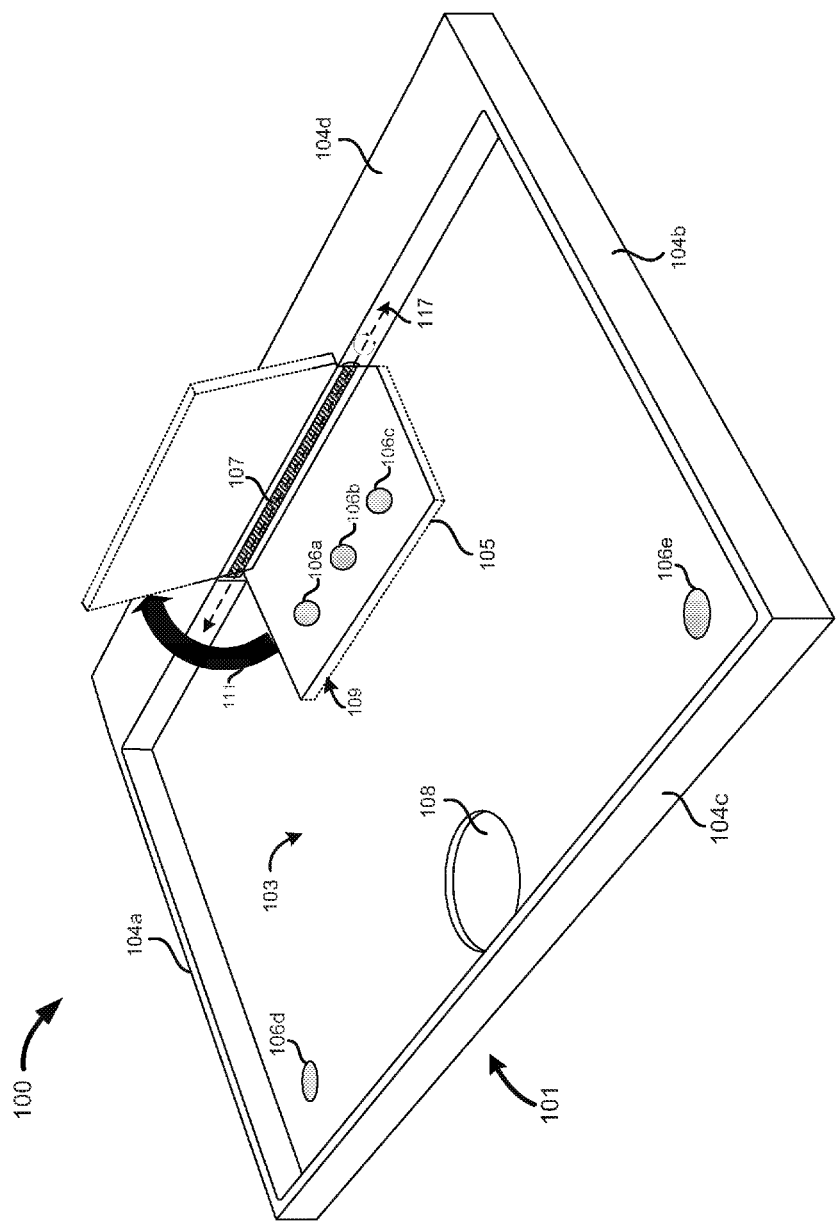
FIG. 1 is a three-dimensional perspective view of a protective hinge cover in accordance with an example of the present invention.

The following discussion is directed to various embodiments. Although one or more of these embodiments may be discussed in detail, the embodiments disclosed should not be interpreted, or otherwise used, as limiting the scope of the disclosure, including the claims. In addition, one skilled in the art will understand that the following description has broad application, and the discussion of any embodiment is meant only to be an example of that embodiment, and not intended to intimate that the scope of the disclosure, including the claims, is limited to that embodiment. Furthermore, as used herein, the designators "A", "B" and "N" particularly with respect to the reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the user of similar digits. For example, 143 may reference element "43" in FIG. 1, and a similar element may be referenced as 243 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Today, most device sleeves or cases are limited in functionality and offer minimal protection for the mobile computing device. One prior solution includes the addition of a support element or "kick stand" formed on the back of the cover. This configuration, however, undesirably adds thickness to the cover and only offers one viewing angle for the mobile device. In addition, these support stands represent an additional mechanical part that is externally exposed and thus susceptible to damage or breakage. Still further, some prior protection covers enclose the entire non-display area of the device thereby reducing the slim profile of the device and adding additional bulk to the total carrying weight. As such, there is a need in the art for a device cover configured to display the mobile device at multiple view angles without adding significant thickness to the protective cover itself.

Examples of the present invention provide a protective hinge cover for a mobile computing device. According to one example, the protective cover includes a movable attachment member and a plurality of the coupling features for attaching to the mobile computing device. A hinge element is disposed within the frame of the protective cover and joined to the movable attachment member so as to enable an attached mobile computing device to be positioned at multiple viewing angles when placed on a flat surface.

Referring now in more detail to the drawings in which like numerals identify corresponding parts throughout the views, FIG. 1 is a three-dimensional perspective view of a protective hinge cover in accordance with an example of the present invention. As shown here, the protective hinge cover 100 includes a housing frame 101 having a plurality of perimeter sides 104a-104d and a base side 102. More particularly, parallel perimeter sides 104a and 104b are joined with ends of parallel perimeter sides 104c and 104, while the base side 102 joins with all of the perimeter sides 104a-104d so as to form a protective boundary and inner cavity area 103 for housing the mobile computing device. In one example, perimeter side 104d is formed to be broader than perimeter sides 104a-104c in order to provide encasing of hinge mechanism 107 and a support surface for the mobile computing device when in an upright orientation. The base side 102 of the housing frame 101 includes an ejection aperture 108 formed near a central area proximate to perimeter side 104c, in addition to an opening 109 (in a central area of side 104d opposite side 104c of the ejection aperture 108) for which a movable attachment member 105 rests when in a non-angled, or leveled, position. As shown in FIG. 1, he moveable or rotatable attachment member 105 may be formed from a segment of the base 102 and the perimeter side 104d, and is capable of manual articulation (e.g. up to 180°) via a friction hinge 107. That is, the friction hinge 107 and movable attachment member 105 are configured to rotate about a horizontal axis of rotation 117 so as to cause the movable attachment member 105 to rotate from a leveled position within opening 109 and out toward the perimeter side 104d into an angled or upright position (as indicated by the directional arrow 111). According to one example embodiment, the housing frame 101 is constructed from a rigid thermoplastic material such as polycarbonate or acrylonitrile butadiene styreneaerial (ABS) for example.

Still further, the rotatable attachment member 105 includes multiple coupling features 106a-106e for joining or fastening with a mobile computing device as will be shown and described in further detail below. In one example, inner coupling features 106a-106c and outer coupling features 106d-106e represent a plurality of magnets or magnetic retention elements used to engage with corresponding magnetic elements on a mobile computing device. However, examples of the present invention are not limited magnetic retention, as the coupling features may include any adhesive/coupling element capable of simple and secure attachment and detachment from a surface based on force exerted from a user. Moreover, the inner coupling features 106a-106c and/or attachment member 105 may include inductive properties so as to provide a docking mechanism and electrical communication with the mobile computing device. Additionally, the base side 102 of the protective hinge cover may include a circuit board or component interface(s) that enable electrical communication (via USB/HDMI/SD for example) with external devices (e.g., keyboard, monitor, memory card).

Figure 2A:
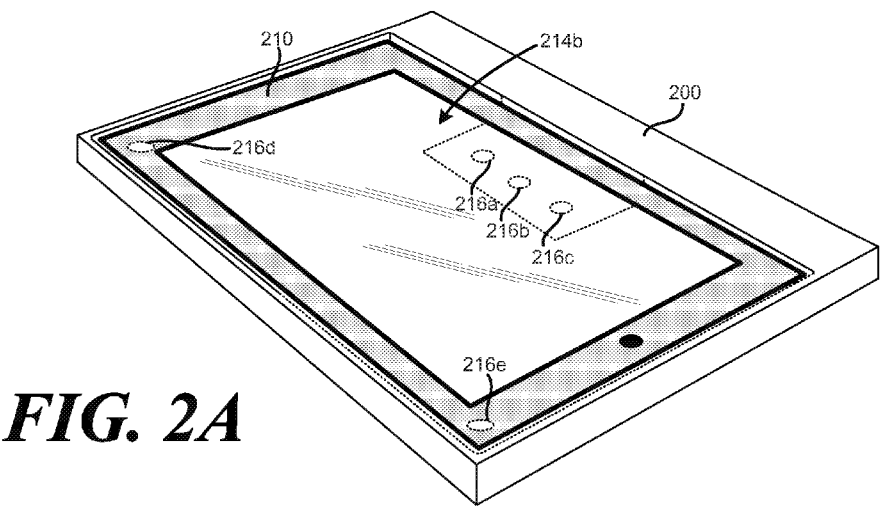
FIGS. 2A and 2B are three-dimensional perspective views of a protective hinge cover and mobile computing device according to an example of the present invention.
Figure 2B:
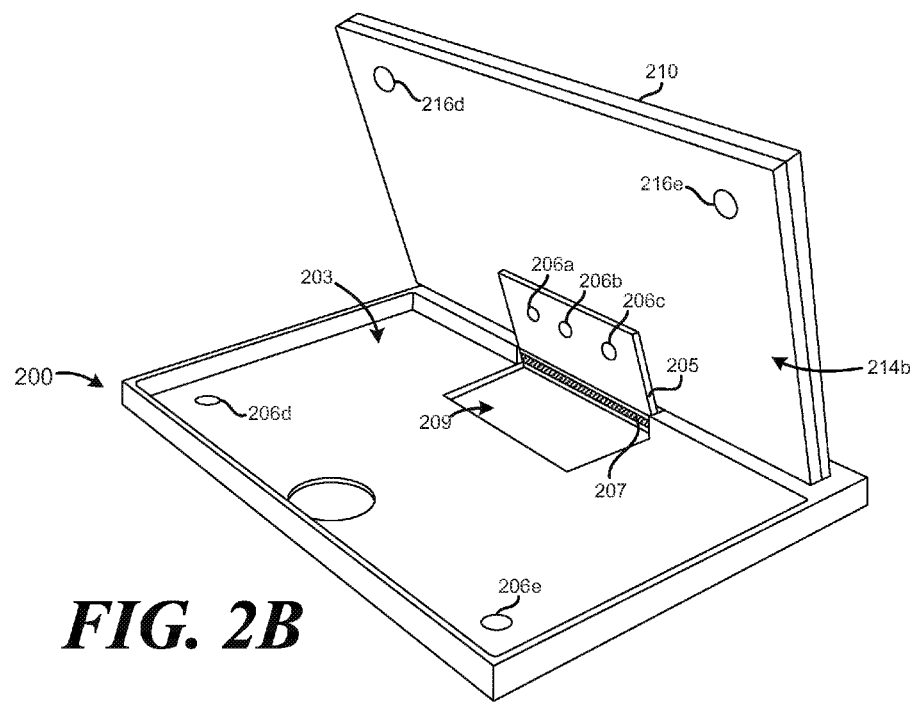

FIGS. 2A and 2B are three-dimensional perspective views of a protective hinge cover and mobile computing device according to an example of the present invention. More particularly, FIG. 2A depicts the protective hinge cover 200 and mobile computing device 210 in a coplanar and protected position (i.e., first viewing orientation). As shown here, the mobile computing device 210 is positioned within the inner cavity (203 of FIG. 2B) of the hinge cover 200 so as to lie parallel with the base side thereof. Moreover, device coupling features 216a-216e (inner 216a-216c and outer 216d-216e) are formed on a rear side (214b of FIG. 2B) of the computing device 210 and serve to join and maintain the mobile computing device 210 in a fixed position within the inner cavity area 203 of the protective hinge cover 200. In the present example, the display side 214a of the computing device 210 faces upright and towards the operating user for easy viewing of displayed electronic content. Accordingly, the perimeter and base sides of the hinge cover 200 offer protections for the perimeter and rear sides of the mobile computing device 210 while in the first viewing orientation.

Turning now to the depiction of FIG. 2B, the protective hinge cover 200 and mobile computing device 210 are shown in a second viewing orientation in which the mobile computing device 210 is placed upright and angled away from the base side of the protective hinge cover 200. According to the one example, the mobile computing device 210 may be ejected from the inner cavity area 203 of the hinge cover 200 via the ejection aperture 208 (described in further detail with respect to FIGS. 3A-3C). Upon user-initiated ejection, or upward lifting of device 210 from the cavity area 203, the coupling features 216d and 216e of the mobile computing device 210 disengage with the computing features 206d and 206e of the protective hinge cover 200. However, and accordingly to one example, coupling features 206a-206c remain engaged with coupling features 216a-216c such that ejection of the mobile computing device 210 from area 203 causes the movable attachment member 205 to rotate in an upward direction and out and away from opening 209. More particularly, the embedded friction hinge 206 enables full articulation of the movable attachment 205 and in turn, the mobile computing device 210, thereby allowing the computing device to be displayed at multiple viewing angles with respect to the operating user and normal operating surface. Still further, when in the mobile device is in the upright viewing position, the base side of the housing frame rests against a normal surface and serves as a support structure for providing stability to protective hinge cover 200 and display device 210.

Figure 3A:
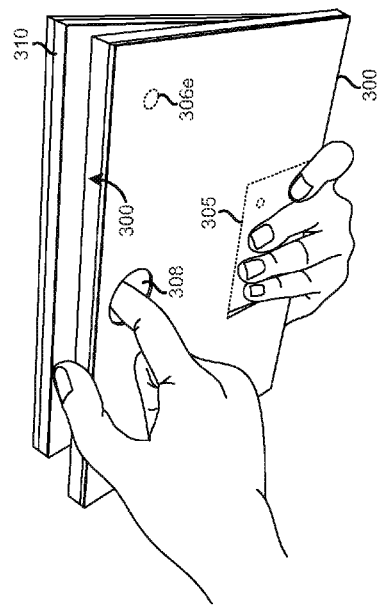
FIGS. 3A-3C illustrate one process for removing the mobile computing device from the protective hinge cover according to an example of the present invention.
Figure 3B:
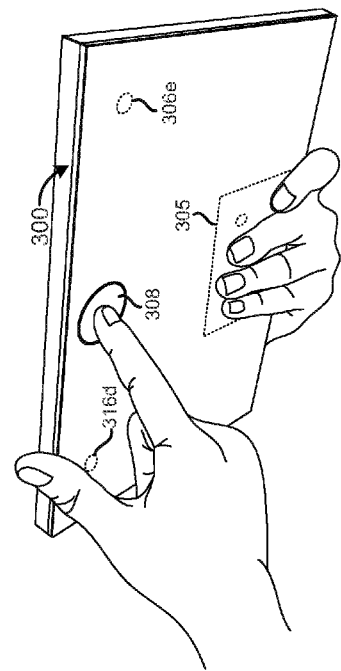
Figure 3C:
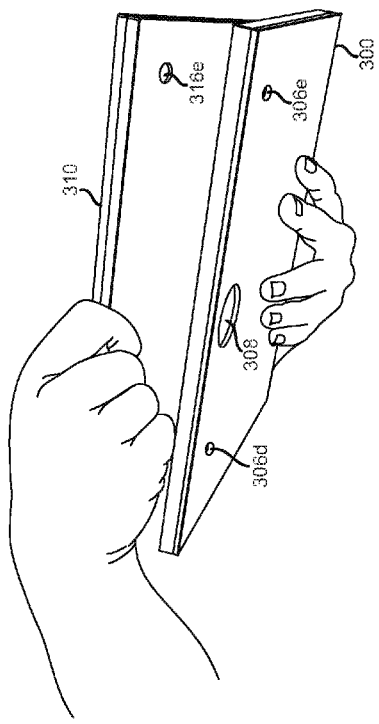

FIGS. 3A-3C illustrate one process for removing the mobile computing device from the protective hinge cover according to an example of the present invention. As shown in FIG. 3A, the operating user holds the protective hinge cover 300 and mobile computing device 310 in a first viewing orientation in which the device 310 is housed within the inner cavity area of the hinge cover and coplanar with the base side of the hinge cover. According to one example, while in the first viewing orientation coupling features 316d and 316e of the mobile device are magnetically engaged with coupling features 306d and 306e (shown in FIG. 3C) of the protective hinge cover 300. In the example of FIG. 3B, the user ejects or dislodges the mobile computing device 310 from the inner cavity area by placing their finger through the ejection aperture 308. Such action serves to disengage the outer coupling features 316d-316e of the mobile device 310 from the outer coupling features 306d-306e of the hinge cover 300, and also forces (via the friction hinge) the attachment member 305 and the mobile computing device 310 to extend in a direction perpendicular to the normal surface. Thereafter, the user may remove the computing device 310 from the protective cover 300 by pulling the device in an outward direction so as to disengage the inner coupling features (206a-206c and 216a-216c of FIGS. 2A and 2B)

Figure 4B:
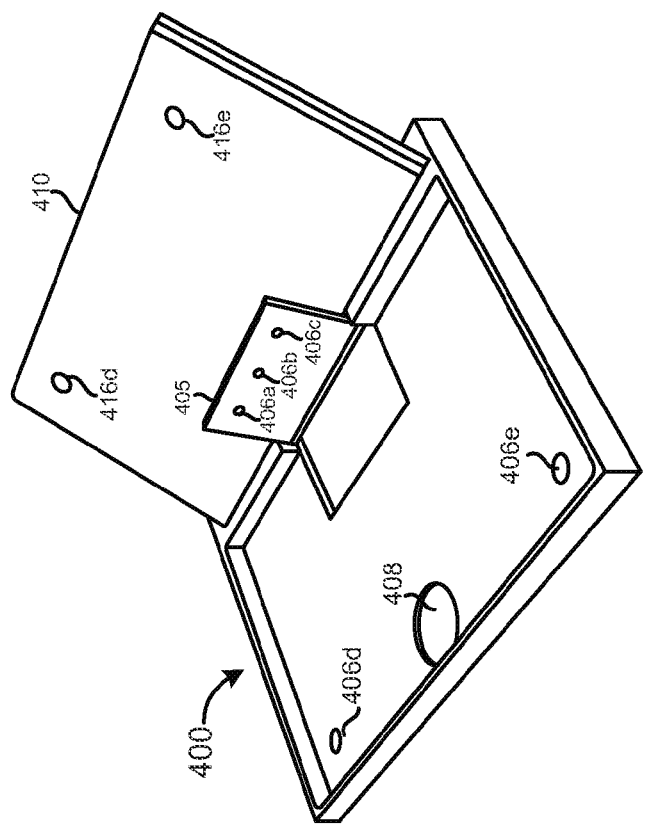
FIGS. 4A and 4B illustrate one process of attaching a mobile computing device to the protective hinge cover according to an example of the present invention.
Figure 4A:
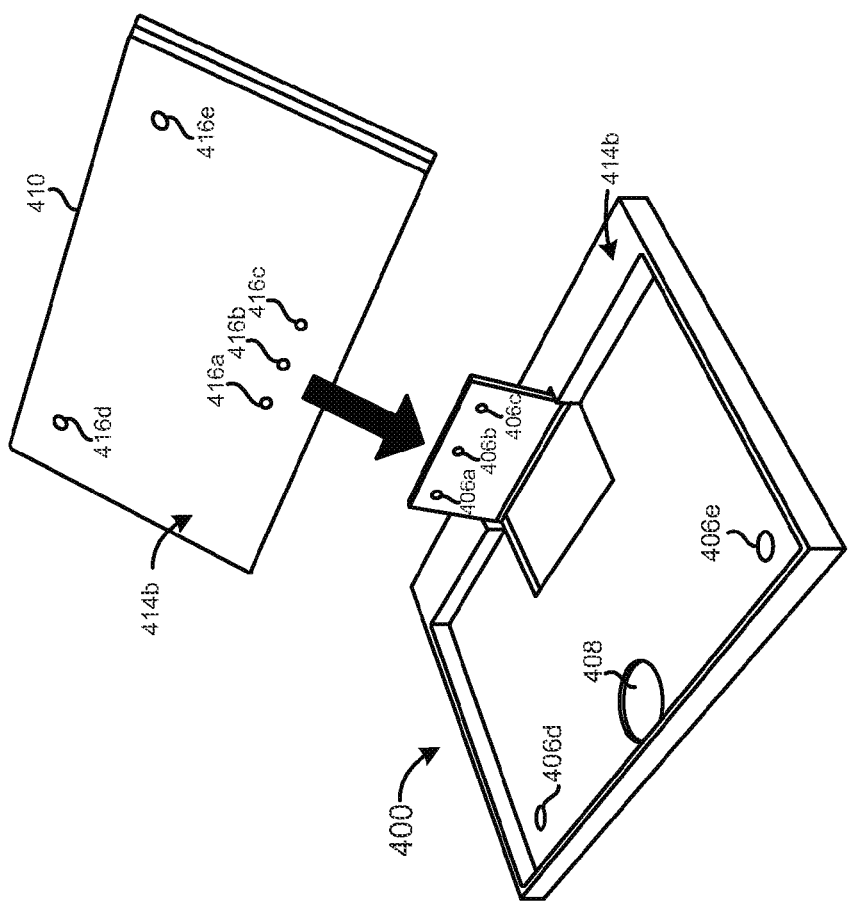

FIGS. 4A and 4B illustrate one process of attaching a mobile computing device to the protective hinge cover according to an example of the present invention. As shown in the example of FIG. 4A, the mobile computing device 410 is being descended into the direction of the protective hinge cover 410. As explained before, inner coupling features 416a-416c formed on the rear side of the computing device are configured to mate and join (e.g., magnetic retention) with the inner coupling features 406a-406c of the hinge cover 400 for a first securing means, while outer coupling features 416d and 416e of device 410 are configured to mate and join with outer coupling features 406d and 406e the hinge cover 400 for a second or reinforced securing means. Specifically, positioning of the inner coupling features 406a-406c and outer coupling features 406d-406e of the protective hinge cover 400 correspond with the positions of the inner coupling features 416a-416c and outer coupling features 416d-416e of the mobile computing device 410. As shown in FIG. 4B, the computing device 410 is docked and attached to the movable attachment member 405 via the inner coupling features. Moreover, when in the angled, or unleveled, position with respect to the normal surface, a lower side of the mobile computing device may rest on the broader perimeter side 404d of the hinge cover 400 for additional lower support.

Figure 5:
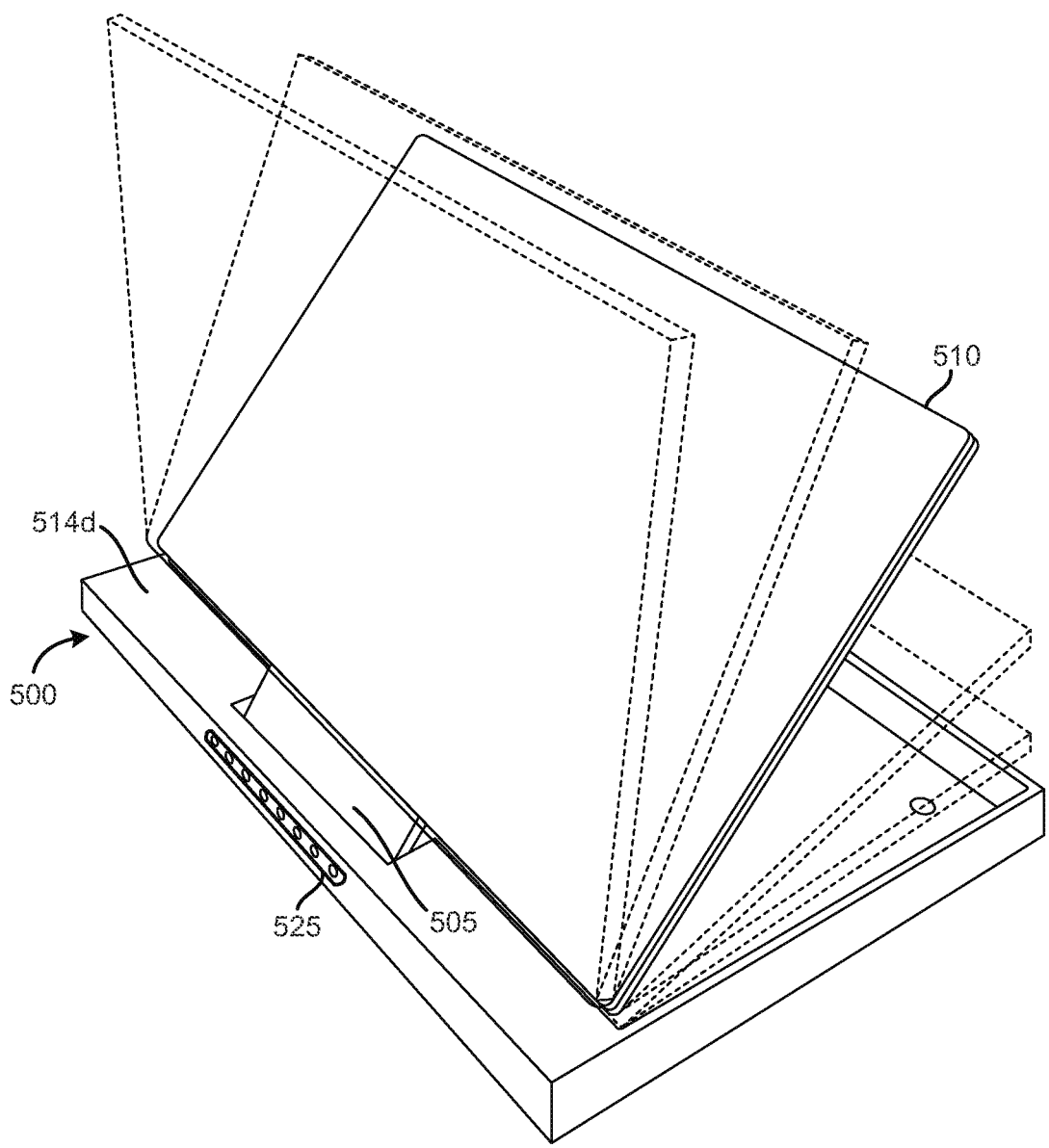
FIG. 5 is a three-dimensional view of articulating movement for the mobile computing device facilitated by the protective hinge cover in accordance with an example of the present invention.

FIG. 5 is a three-dimensional view of articulating movement for the mobile computing device facilitated by the protective hinge cover in accordance with an example of the present invention. As shown in the present example, the mobile computing device 510 may be rotated at various angles and provide a multitude of viewing positions for the operating user. More particularly, the articulation provided by the friction hinge described herein allows the operating user to position the mobile device 510 at any desired viewing angle such that the mobile device remains fixed and set at the desired position/viewing angle. In addition, a docking connector pass through 525 may be formed on the perimeter side 514d (or any side thereof) of the hinge cover 500 for allowing for docking of the mobile device 510 to an external docking station without detaching the hinge cover 500 from the mobile device 510.

Examples in accordance with the present invention provide a protective hinge cover for a mobile computing device. Moreover, many advantages are afforded by the configuration disclosed herein. For instance, the articulating hinge mechanism of the present examples is formed internally to the cover and is therefore protected from impact areas/conditions external to the protective cover. Furthermore, inclusion of a magnetic retention design does not create additional thickness for the protective cover thus retaining a slim profile that substantially mirrors the mobile computing device. Lastly, the fully articulating hinge mechanism enables the attached display device to be viewed at multiple angles simply through one-handed movement of the computing device rather than the inconvenient set-up process of prior solutions.

Furthermore, while the invention has been described with respect to exemplary embodiments, one skilled in the art will recognize that numerous modifications are possible. For example, although exemplary embodiments depict a tablet personal computer as the mobile computing device, the invention is not limited thereto. For example, the mobile computing device may be a smartphone, digital audio player, gaming console or any other portable or handheld electronic device that may be enclosed via a protective casing and lacks a support structure for providing multiple viewing angles.

Furthermore, the plurality of coupling features may be formed at additional or alternate places within the inner cavity area and on the mobile computing device than the positions described and shown in examples above. For example, coupling features may be placed along the side walls of the inner cavity area and along corresponding perimeter sides of the mobile computing device rather than the rear side as described above. Similarly, the ejection aperture may be formed of any shape or at any position along the base side of the protective hinge cover. Thus, although the invention has been described with respect to exemplary embodiments, it will be appreciated that the invention is intended to cover all modifications and equivalents within the scope of the following claims.

What is claimed is:

1. A protective hinge cover for a mobile computing device, the protective hinge cover comprising:
    a housing frame having an inner cavity area for receiving the mobile computing device, wherein the housing frame includes a base side and perimeter edges for enclosing the mobile computing device;
    a moveable attachment member including a hinge mechanism and formed from a segment of the base side of the housing frame;
    a plurality of coupling features formed on the base side of the housing frame and the moveable attachment member for facilitating attachment with the mobile computing device;
    wherein the moveable attachment member and the housing frame are configured to provide a movable and stable structure for the mobile computing device and also allow for adjustment by an operating user so as to provide multiple viewing angles via the hinge mechanism of the moveable attachment member.

2. The cover of claim 1, wherein the housing frame is configured to provide an enclosure for only the perimeter and rear sides of the mobile computing device when the mobile computing device and the moveable attachment member are adjacent to the base side of the housing frame.

3. The cover of claim 2, wherein the plurality of coupling features includes a plurality of inner coupling features formed on the moveable attachment member and a plurality of outer coupling features formed within the inner cavity area on the base side of the housing frame.

4. The cover of claim 3, wherein the plurality of coupling features are formed on a rear side of the mobile computing device at positions corresponding to the positions of the plurality of outer coupling features formed within the cavity area of the housing frame and the plurality of inner coupling features formed on the moveable attachment member.

5. The cover of claim 4, wherein the plurality of coupling features formed on the housing frame and the mobile computing device are magnets, and
    wherein the mobile computing device is affixed to the moveable attachment member and housing frame via magnetic retention afforded by the plurality of coupling features.

6. The cover of claim 2, wherein the moveable attachment member is configured to rest within an opening formed within the base side of the housing frame when the mobile computing device is parallel to a normal surface.

7. The cover of claim 1, wherein the housing frame includes a first perimeter side, a second perimeter side opposite the first perimeter side, an ejection perimeter side, and a hinge side opposite the ejection side.

8. The cover of claim 7, further comprising:
    an ejection aperture formed within a central region on the ejection side opposite the moveable attachment member;
    wherein the ejection aperture is utilized by the operating user to disengage the mobile computing device from attachment with at least one coupling feature of the protective hinge cover.

9. The cover of claim 7, wherein the hinge mechanism is integrated within the hinge side of the housing frame.

10. The cover of claim 1, wherein the housing frame is comprised of a thermoplastic material.

11. A protective display system comprising:
    a mobile computing device having perimeter sides, a display side, and a rear side opposite the display side; and
    a protective hinge cover including:
        a housing frame having an inner cavity area for receiving the mobile computing device, wherein the housing frame is configured to enclose the perimeter sides and the rear side of the mobile computing device;
        a rotatable attachment member formed from a segment of the housing frame and including a plurality of coupling features for facilitating attachment with the mobile computing device;
    wherein the rotatable attachment member and housing frame are configured to provide a movable and stable structure for the mobile computing device and also allow for adjustment by an operating user so as to provide multiple viewing angles via a hinge mechanism associated with the rotatable attachment member.

12. The system of claim 11, wherein the plurality of coupling features includes a plurality of inner coupling features formed on the rotatable attachment member and a plurality of outer coupling features formed within the inner cavity area on a base side of the housing frame.

13. The system of claim 12, wherein the mobile computing device includes a plurality of coupling features formed on a rear side at positions corresponding to the positions of the outer coupling features formed within the cavity area of the housing frame and the inner coupling features formed on the rotatable attachment member.

14. The system of claim 13, wherein the plurality of coupling features formed on the housing frame and the rotatable attachment member are magnets, and
    wherein the mobile computing device is fixed onto the rotatable attachment member and the housing frame via magnetic retention afforded by the plurality of coupling features.

15. The system of claim 12, wherein the rotatable attachment member is configured to rest within an opening formed within the base side of the housing frame when the mobile device is parallel to a normal surface.

16. The system of claim 12, wherein the housing frame further comprises:
   an ejection aperture formed within the base side of the housing frame, and
   wherein the ejection aperture is utilized by the operating user to disengage the mobile computing device from attachment with at least one coupling feature of the protective hinge cover.

17. The system of claim 12, wherein the hinge mechanism is integrated within a hinge side of the housing frame.

18. The system of claim 11, wherein the housing frame of the protective hinge cover is comprised of a thermoplastic material.

19. A protective hinge cover apparatus for a mobile computing device, the apparatus comprising:
   a housing frame having a base side and an inner cavity area for receiving the mobile computing device;
   a rotatable attachment member formed from a segment of the base side of housing frame and including a plurality of magnetic features for facilitating attachment with the mobile computing device; and
   a hinge mechanism associated with the rotatable attachment member and formed within a side of the housing frame,
   wherein the frame is configured to provide an enclosure for a perimeter and rear side of the mobile computing device when the mobile computing device and rotatable attachment member are adjacent to a base side of the housing frame,
   wherein the plurality of magnetic features are formed on a rear side of the mobile computing device at positions corresponding to the positions of the magnetic coupling features formed on the rotatable attachment member of the housing frame, and
   wherein the rotatable attachment member and housing frame are configured to provide a movable and stable structure for the mobile computing and also allow for adjustment by an operating user so as to provide multiple viewing angles via the hinge mechanism.

* * * * *